US008270982B2

United States Patent
Yi et al.

(10) Patent No.: US 8,270,982 B2
(45) Date of Patent: Sep. 18, 2012

(54) METHOD, SYSTEM AND EQUIPMENT FOR SHIFTING CALL BASED ON A MOBILE TERMINAL WITH THE SAME NUMBER AND A SOFT TERMINAL

(75) Inventors: Zhiquan Yi, Shenzhen (CN); Hongming Chen, Shenzhen (CN); Guihua Li, Shenzhen (CN); Yi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 12/886,178

(22) Filed: Sep. 20, 2010

(65) Prior Publication Data
US 2011/0021200 A1    Jan. 27, 2011

Related U.S. Application Data

(63) Continuation of application No. PCT/CN2009/070887, filed on Mar. 19, 2009.

(30) Foreign Application Priority Data

Mar. 20, 2008 (CN) .......................... 2008 1 0084381

(51) Int. Cl.
*H04W 36/00* (2009.01)
(52) U.S. Cl. .................... 455/442; 455/417; 379/211.02; 379/212.01
(58) Field of Classification Search .............. 455/414.1, 455/411, 466, 442, 415, 417, 455; 379/211.01, 379/211.02, 212.01
See application file for complete search history.

(56) References Cited

U.S. PATENT DOCUMENTS

| | | | | |
|---|---|---|---|---|
| 6,665,390 B1 * | 12/2003 | Ekstrom | .................. | 379/201.01 |
| 6,845,152 B2 * | 1/2005 | Taff et al. | ................. | 379/211.02 |
| 7,082,192 B2 * | 7/2006 | Weaver | .................... | 379/211.02 |
| 7,406,324 B1 * | 7/2008 | McConnell | .................... | 455/466 |
| 8,000,451 B1 * | 8/2011 | Aubuchon et al. | .......... | 379/15.03 |
| 2005/0215233 A1 * | 9/2005 | Perera et al. | .................. | 455/411 |
| 2008/0056475 A1 | 3/2008 | Brannick et al. | | |

FOREIGN PATENT DOCUMENTS

| | | |
|---|---|---|
| CN | 1741453 A | 3/2006 |
| CN | 101052161 A | 10/2007 |
| CN | 101107875 A | 1/2008 |

(Continued)

OTHER PUBLICATIONS

1st Office Action in corresponding Chinese Application No. 200810084381.0 (Apr. 8, 2010).

(Continued)

*Primary Examiner* — Cong Tran
(74) *Attorney, Agent, or Firm* — Leydig, Voit & Mayer, Ltd.

(57) ABSTRACT

A method for switching call between a mobile terminal with the same number and a soft terminal includes: receiving the switching instruction information sent by the soft terminal user during the call between the soft terminal or the mobile terminal with the same number and the opposing user; confirming the type of the switching instruction information, and carrying out the switching performance between the mobile terminal with the same number and the soft terminal according to the type of the switching instruction information. A system and an equipment for switching call between a mobile terminal with the same number and a PC client are disclosed in the present invention.

11 Claims, 6 Drawing Sheets

FOREIGN PATENT DOCUMENTS

CN    101242663 A    8/2008

OTHER PUBLICATIONS

Written Opinion of the International Searching Authority in corresponding PCT Application No. PCT/CN2009/070887 (Jun. 18, 2009).

Shaom in et al., "Seamless Handover Between CS and IMS," Jan. 7, 2007, China Academic Journal Electronic Publishing House, Beijing, China.

Extended European Search Report in corresponding European Application No. 09722393.7 (Jul. 6, 2011).

Office Action in corresponding European Patent Application 09722393.7 (Apr. 11, 2012).

Shaomin et al., "VCC Technology: Seamless Handover Between CS and IMS," Mobile Communications, Feb. 2007, Issue 2, China Academic Journals Electronic Publishing House, Beijing, China.

* cited by examiner

METHOD, SYSTEM AND EQUIPMENT FOR SHIFTING CALL BASED ON A MOBILE TERMINAL WITH THE SAME NUMBER AND A SOFT TERMINAL

CROSS-REFERENCE TO RELATED APPLICATIONS

This application is a continuation of International Application No. PCT/CN2009/070887, filed on Mar. 19, 2009, which claims priority to Chinese Patent Application No. 200810084381.0 filed on Mar. 20, 2008, both of which are hereby incorporated by reference in its entireties.

FIELD OF THE INVENTION

The present invention relates to the field of communication technologies, and in particular to a method, system and device for call switching based on a mobile terminal and a soft terminal which are of a same number.

BACKGROUND OF THE INVENTION

In conventional systems, a soft terminal (e.g. a Personal Computer, PC, client, etc.) and a mobile terminal can be implemented to use the same number and vibrate simultaneously with each other. This interconnects the PC client and the mobile terminal which serve as the major two entities of an enterprise. However, the interoperability there between is not satisfying enough. For example, when a user is calling with a called party via the PC client, if he has to leave his office for an unpredictable reason and meanwhile wants to maintain the current call, the call on the PC client cannot be switched to the mobile terminal of the same number. On the other hand, if he comes back to his office, the call on the mobile terminal cannot be switched to the PC client either of the same number.

SUMMARY OF THE INVENTION

The embodiments of the present invention provide a method, system and device for call switching based on a mobile terminal and a soft terminal which are of a same number, thus realizing a seamless call switching between the soft terminal and mobile terminal over the Internet Protocol (IP) network and the Global System for Mobile Communications/3rd Generation (GSM/3G) network.

An embodiment of the present invention provides a method for call switching based on a mobile terminal and a soft terminal which are of a same number, wherein the method includes: (a) receiving switching instruction information sent from a user of the soft terminal during a call between the soft terminal or the terminal and an opposite user; and (b) determining a type of the switching instruction information, and performing a switching between the mobile terminal and the soft terminal according to the type of the switching instruction information.

An embodiment of the present invention further provides a system for call switching based on a mobile terminal and a soft terminal which are of a same number, wherein the system includes the soft terminal, the mobile terminal and a call application server, wherein the call application server is adapted to receive a switching message sent from a user of the soft terminal during a call between the soft terminal or the mobile terminal and an opposite end, wherein the switching message carries switching instruction information, and to perform a switching between the mobile terminal and the soft terminal according to the switching instruction information.

An embodiment of the present invention further provides a call application server, which includes: (a) a receiving unit, adapted to receive a switching message sent from a user of a soft terminal during a call between the soft terminal or a mobile terminal and an opposite end, where the mobile terminal and the soft terminal are of a same number and the switching message carries switching instruction information; (b) a parsing unit, adapted to parse a command tab contained in a body of the switching message, and to determine whether the tab represents a call forwarding request or a call switching-into request; and (c) a switching unit, adapted to perform a switching between the mobile terminal and the soft terminal where the mobile terminal and the soft terminal are of a same number according to a parse result of the parsing unit.

According to the embodiments of the present invention, by triggering a switching function of the soft terminal, the user can switch an ongoing call on the soft terminal to the mobile terminal, where the mobile terminal and the soft terminal are of a same number, or switch an ongoing call on the mobile terminal to the soft terminal. The opposite party of the call feels no difference during the whole call switching process, thus achieving a seamless switching.

DETAILED DESCRIPTION OF THE EMBODIMENTS

Figure 1:
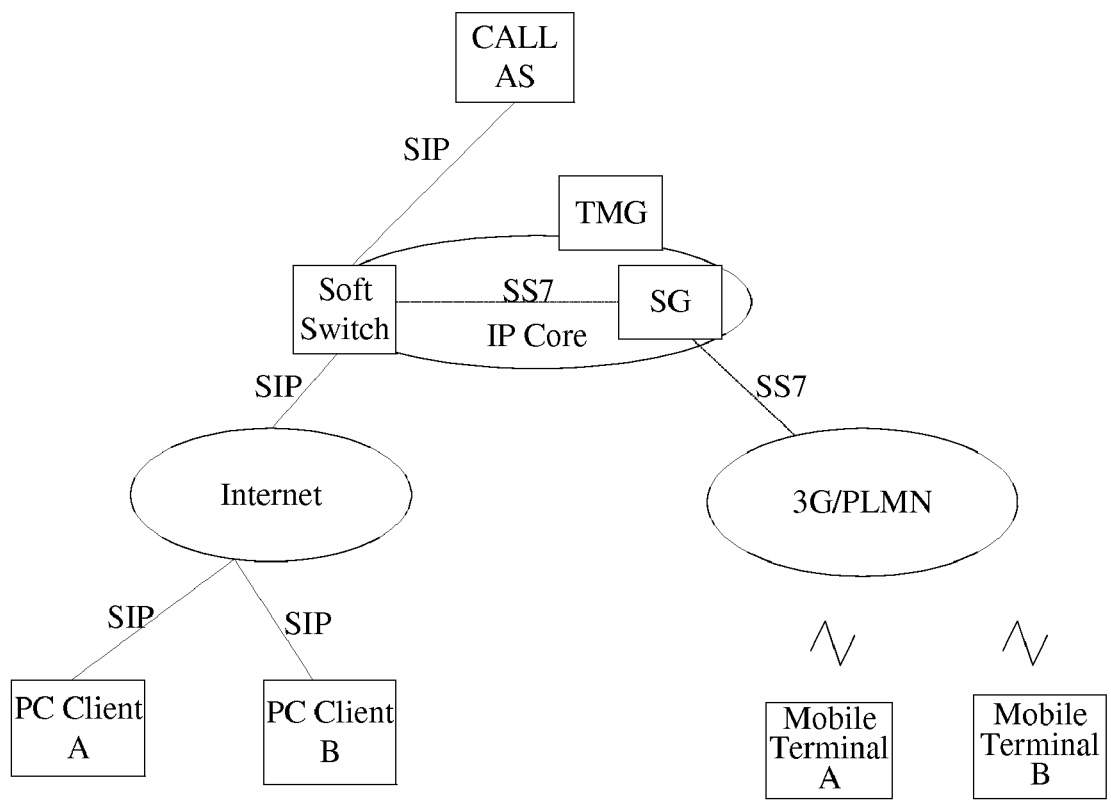
FIG. 1 is a schematic diagram illustrating networking of a PC client and a mobile terminal which are of the same number according to the present invention.

Embodiments of the present invention provide solutions based on a soft terminal (e.g. a PC client, etc.) and a mobile terminal which are of the same number over the IP network and the GSM/3G network. FIG. 1 shows the following: a Call Application Server (Call AS), mainly adapted to provide a call service and a call control; a Softswitch, which is the core of the call control, adapted to implement functions such as protocol adaptation, call processing, service trigger and the like, and to act as the external interface of the system to implement an interconnection function with another system; a Trunk Media Gateway (TMG), adapted to implement functions such as a conversion between an IP packet voice service stream and a Public Switched Telephone Network (PSTN) circuit voice and the like; a Signaling Gateway (SG), adapted to implement a conversion function between the Signaling System 7 (SS7) signaling of a circuit switched network and the Session Initiation Protocol (SIP) signaling of a packet switched network; PC client A and PC client B, adapted to access the IP core network via the Internet; and mobile terminal A and mobile terminal B, adapted to access the IP core network via the 3G/PLMN (Public Land Mobile-communication Network). In the FIG. 1, the dashed line represents the SS7 signaling and the solid line represents the SIP.

In an embodiment, by extending the operation identifier of the Command contained in the body of the INFO message of SIP, one or two different operation identifiers of the Command are defined. Reference can be made to the exemplary depiction of the Command of the INFO message. The Call AS performs determination according to the extended operation identifiers of the Command contained in the INFO message and implements the call switching process between the soft terminal and the mobile terminal which are of the same number.

Specifically, an example of the extended operation identifiers of the Command contained in an INFO message is as follows:

```
INFO sip: 960@ 10.164.23.150; user=phone SIP/2.0
Via: SIP/2.0/UDP 10.164.8.11: 5061; branch=z9hG4bK246995358
From: <sip: 13812345678@ 10.164.23.150; user=phone>;
tag=3469846059
To: <sip: 13812345678@ 10.164.23.150: user=phone>
Call-ID: 93416920@ 10.164.8.11
Cseq: 211 INFO
Max-Forwards: 5
User-Agent: Flexit Softphone v1.0
Subject: Client Request
Allow: INVITE, ACK, CANCEL, BYE, OPTIONS, REFER,
SUBSCRIBE, NOTIFY, MESSAGE, INFO
Content-Type: text/xml
Content-Length: 154
<inf>
<cmd>4001</cmd>
<caller>13812345678</caller>
<callee>13854681795</callee>
...
...
</inf>
```

In the above example of the INFO message, the portion before the "Content-Length: 154" is the standard header of the INFO message of the SIP, and the extended <cmd> sub-node <cmd> contained in the <inf> node in the message is the extended operation identifiers of the Command. The identifier can be defined as one or two different command tabs by one's own. For example, an identifier 4001 can be defined to represent that the call needs to be switched to the mobile terminal which is of the same number as the soft terminal, while an identifier 4002 can be defined to represent that the call needs to be switched to the soft terminal which is of the same number as the mobile terminal.

A call switching includes two major processes: one is a call forwarding process, i.e. the PC client switches the ongoing call to the mobile terminal of the same number; and another is a call switching-into process, i.e. the ongoing call on the mobile terminal is switched to the PC client via which is of the same number as the mobile terminal. Both of the two processes are implemented by operating one or two keys on the PC client which is of the same number as the mobile terminal.

The implementation of the two processes is described in detail hereinbelow.

Figure 2:
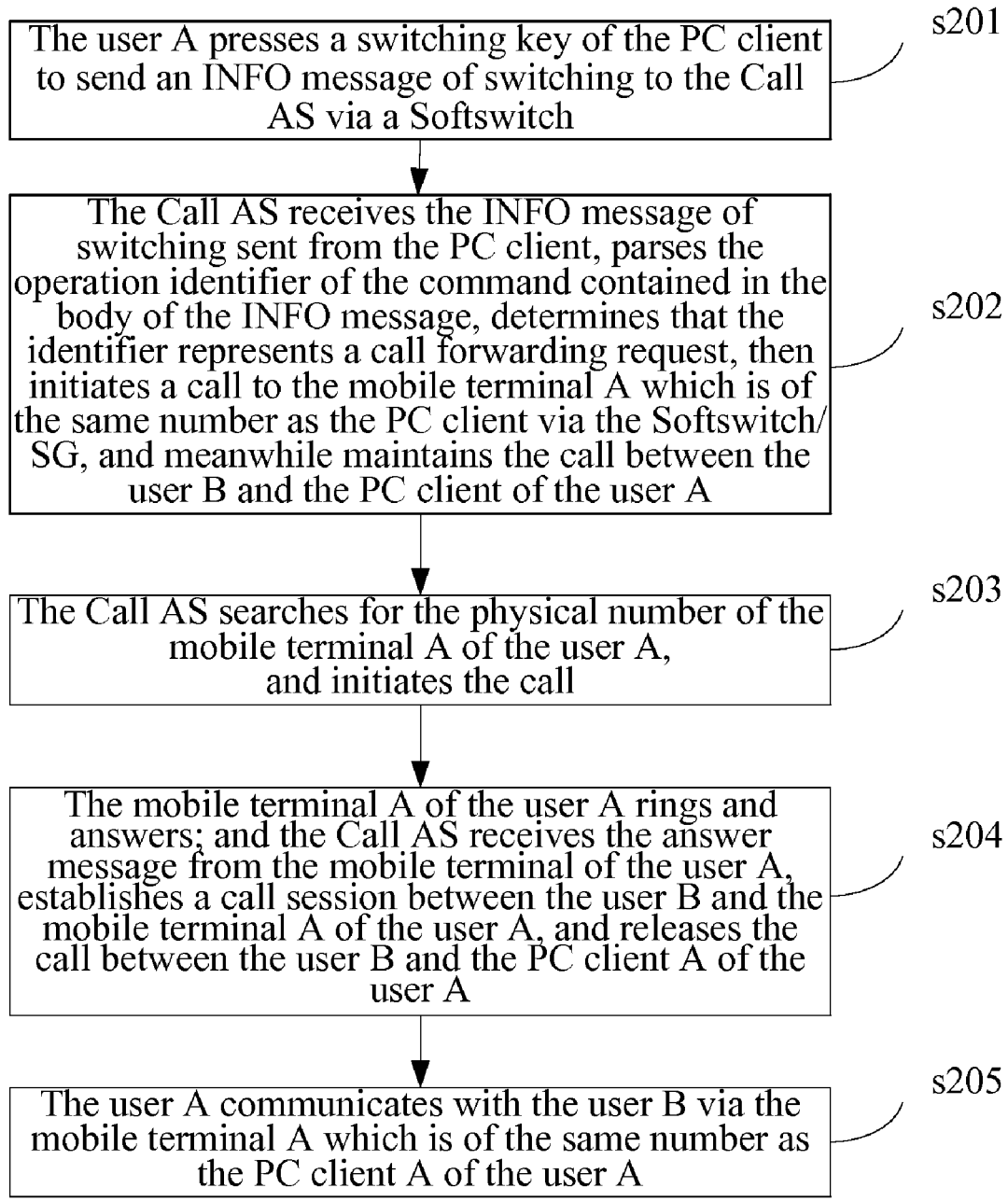
FIG. 2 is a flowchart illustrating a call forwarding process according to the present invention.

According to a first embodiment of the present invention, a flowchart of the call forwarding (namely, PC2Phone) process is as illustrated in FIG. 2. User B calls user A whose PC client and mobile terminal are of the same number (eg, the number of the mobile terminal is 13812345678), and the user A communicates with the user B via the PC client. Specific steps are as follows.

Step s201: The user A presses a switching key of the PC client to send an INFO message of switching to a Call AS via a Softswitch.

Step s202: The Call AS receives the INFO message of switching sent from the PC client, parses the operation identifier of the Command contained in the body of the INFO message, determines that the identifier represents a call forwarding request, then initiates a call to the mobile terminal A which is of the same number as the PC client via the Softswitch/SG, and meanwhile maintains the call between the user B and the PC client of the user A.

An example of the INFO message is as follows:

```
INFO sip: 960@ 10.164.23.150; user=phone SIP/2.0
Via: SIP/2.0/UDP 10.164.8.11: 5061; branch=z9hG4bK246995358
From: <sip: 13812345678@ 10.164.23.150; user=phone>;
tag=3469846059
To: <sip : 13812345678@ 10.164.23.150; user=phone>
Call-ID: 93416920@10.164.8.11
CSeq: 211 INFO
Max-Forwards: 5
User-Agent: Flexit Softphone v1.0
Subject: Client Request
Allow: INVITE, ACK, CANCEL, BYE, OPTIONS, REFER,
SUBSCRIBE, NOTIFY, MESSAGE, INFO
Content-Type: text/xml
Content-Length: 154
<inf>
<cmd>xxxx</cmd>
<caller>13812345678</caller>
<callee>13854681795</callee>
...
...
</inf>
```

Step s203: The Call AS searches for the physical number of the mobile terminal A of the user A, and initiates the call: if the mobile terminal A of the user A is unavailable (no signal, power-off, etc.), the switching request is terminated, and the call on the PC client A of the user A is maintained; and if the mobile terminal A of the user A operates normally and a ring back tone is available, the Call AS is required to shield the called party from the ring back tone of the mobile terminal A of the user A, and Step 204 is executed.

Step s204: The mobile terminal A of the user A rings and answers; and the Call AS receives the answer message from the mobile terminal of the user A, establishes a call session between the user B and the mobile terminal A of the user A, and releases the call between the user B and the PC client A of the user A.

Step s205: The user A communicates with the user B via the mobile terminal A which is of the same number as the PC client A of the user A.

Figure 3:
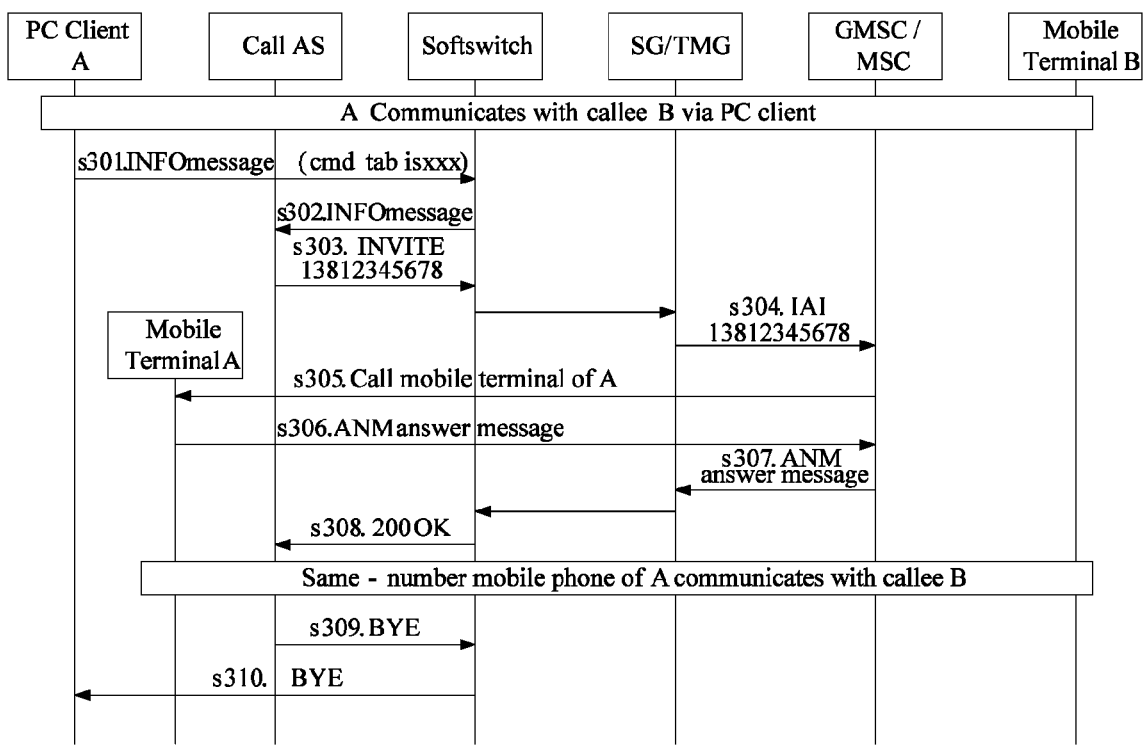
FIG. 3 is a schematic diagram illustrating a call forwarding signaling process according to the present invention.

According to the first embodiment of the present invention, the signaling process of the call forwarding process is as illustrated in FIG. 3. Specific steps are as follows.

Step s301: The user A sends an INFO message carrying the Command tab of call switching to the Softswitch via the PC client A.

Step s302: The Softswitch forwards the INFO message to the Call AS.

Step s303: The Call AS determines that the extended Command tab contained in the INFO message is xxx, and identifies it as a call forwarding command, and then issues an INVITE message via the Softswitch to call the mobile terminal (e.g. 13812345678) of A.

Step s304: Through the SG, the Softswitch converts the INVITE message of SIP for calling the mobile terminal A of the user A into an IAI message of SS7, and sends the IAI message to the destination Gateway Mobile Switching Center/Mobile Switching Center (GMSC/MSC).

Step s305: The GMSC/MSC calls the mobile terminal A of the user A.

Step s306: The user A answers via the mobile terminal A, and returns an ANM answer message to the GMSC/MSC.

Step s307: The GMSC/MSC returns the ANM message to the Softswitch via the SG.

Step s308: The Softswitch returns an answer message 200 OK to the Call AS.

Steps s309 and s310: The user A communicates with B via the mobile terminal A, and the Call AS issues a BYE message to release the session between the user B and the PC client A of the user A.

Figure 4:
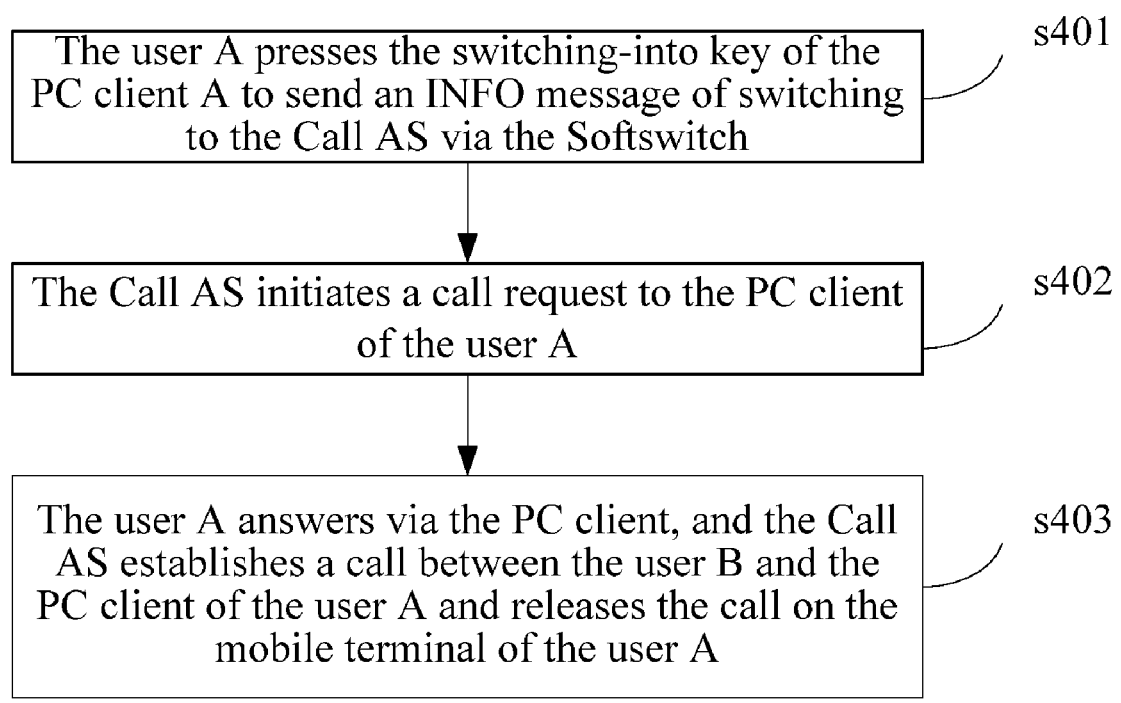
FIG. 4 is a flowchart illustrating a call switching-into process according to the present invention.

In the second embodiment of the present invention, the schematic diagram of call switching-into is as illustrated in FIG. 4. The user B calls the mobile number (13812345678, which is an International Mobile Equipment Identity) of the user A whose PC client and mobile terminal are of the same number. The mobile terminal and the PC client of the user A vibrate simultaneously with each other. The user A can communicate with the user B via the PC client which is of the same number as the mobile terminal. Alternatively, the user A can communicate with the user B via the mobile terminal and then switch the ongoing call to the PC client which is of the same number as the mobile terminal through the PC client. Specific steps are as follows.

Step s401: The user A presses the switching-into key of the PC client A to send an INFO message of switching to the Call AS via the Softswitch.

The INFO message is as follows:

```
INFO sip: 960@ 10.164.23.150; user=phone SIP/2.0
Via: SIP/2.0/UDP 10.164.8.11: 5061; branch=z9hG4bK246995358
From: <sip: 13812345678@ 10.164.23.150; user=phone>;
tag=3469846059
To: <sip : 13812345678@ 10.164.23.150; user=phone>
Call-ID: 93416920@ 10.164.8.11
CSeq: 211 INFO
Max-Forwards: 5
User-Agent: Flexit Softphone v1.0
Subject: Client Request
Allow: INVITE, ACK, CANCEL, BYE, OPTIONS, REFER,
SUBSCRIBE, NOTIFY, MESSAGE, INFO
Content-Type: text/xml
Content-Length: 154
<inf>
<cmd>xxxx</cmd>
<caller>13812345678</caller>
<callee>13854681795</callee>
...
...
</inf>
```

Step s402: The Call AS initiates a call request to the PC client of the user A.

Step s403: The user A answers via the PC client, and the Call AS establishes a call between the user B and the PC client of the user A and releases the call on the mobile terminal of the user A.

Figure 5:
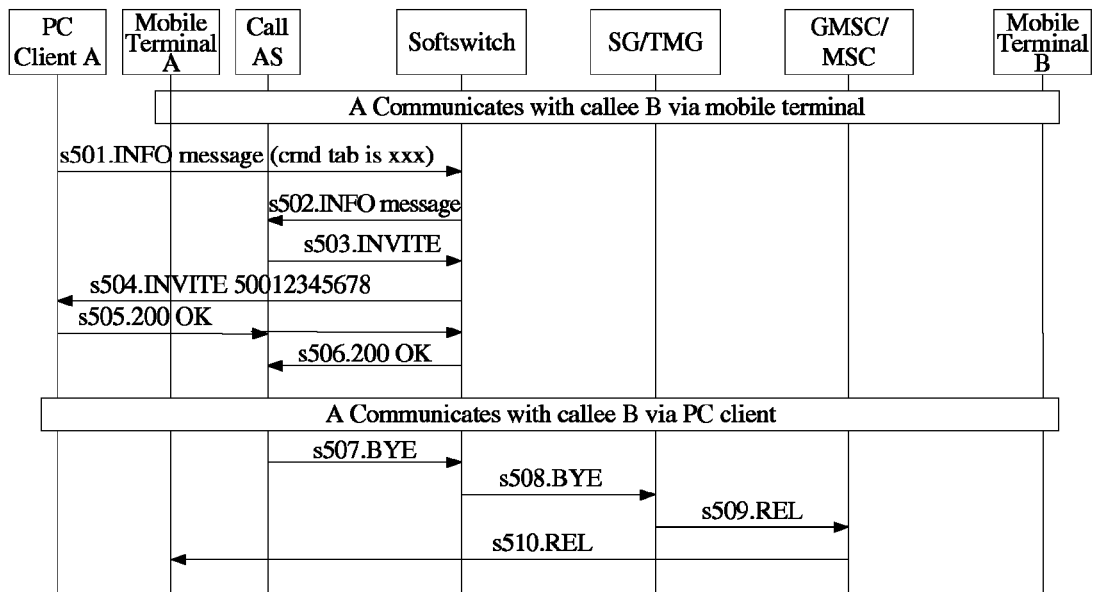
FIG. 5 is a schematic diagram illustrating a call switching-into signaling process according to the present invention.

According to the second embodiment of the present invention, the signaling process of the call switching-into process (Phone2PC) is as illustrated in FIG. 5. Specific steps are as follows.

Step s501: The user A sends an INFO message carrying the Command tab of call switching to the Softswitch via the PC client A.

Step s502: The Softswitch forwards the INFO message to the Call AS.

Step s503: The Call AS determines that the extended Command tab contained in the INFO message is xxx, and identifies it as a call switching-into command, and then issues an INVITE message via the Softswitch to call the PC client A of the user A.

Step s504: Through the INVITE message, the Softswitch calls the soft number 50012345678 of the client A of the user A.

Step s505: The PC client A of the user A answers and returns a 200 OK message to the Softswitch via the Call AS.

Step s506: The Softswitch returns a 200 OK message to the Call AS, and the Call AS establishes a call between B and the client A of the user A.

Step s507: The Call AS issues a BYE message to the Softswitch to release the call on the mobile terminal A of the user A, where the mobile terminal and the soft terminal are of a same number.

Step s508: The Softswitch sends the BYE message to the SG/TMG.

Step s509: The ST/TMG receives the BYE message, converts it into REL signaling and issues it to the GMSC/MSC.

Step s510: The GMSC/MSC issues the REL signaling to the mobile terminal A to release the call on the mobile terminal A of the user A.

Figure 6:
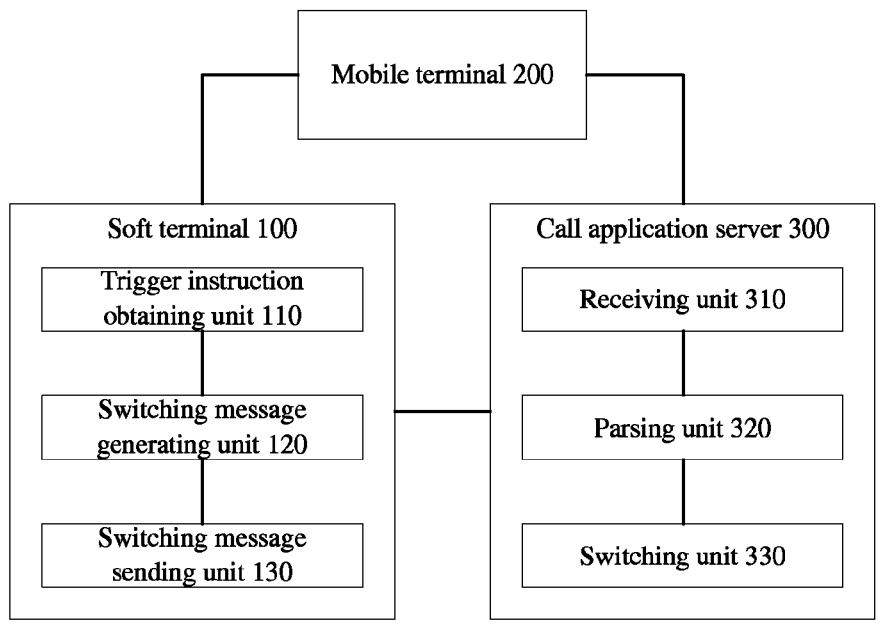
FIG. 6 is a schematic diagram illustrating a structure of a system for call switching based on a mobile terminal and a PC client which are of the same number according to an embodiment of the present invention.

As illustrated in FIG. 6, an embodiment of the present invention further provides a system for call switching based on a mobile terminal and a soft terminal which are of a same number, which system includes the soft terminal 100, the mobile terminal 200 and a call application server 300, wherein the call application server 300 is adapted to receive a switching message sent from a user during a call between the soft terminal or the mobile terminal and an opposite end, wherein the switching message carries switching instruction information, and to perform a call switching between the mobile terminal and the soft terminal according to the switching instruction information.

Figure 7:
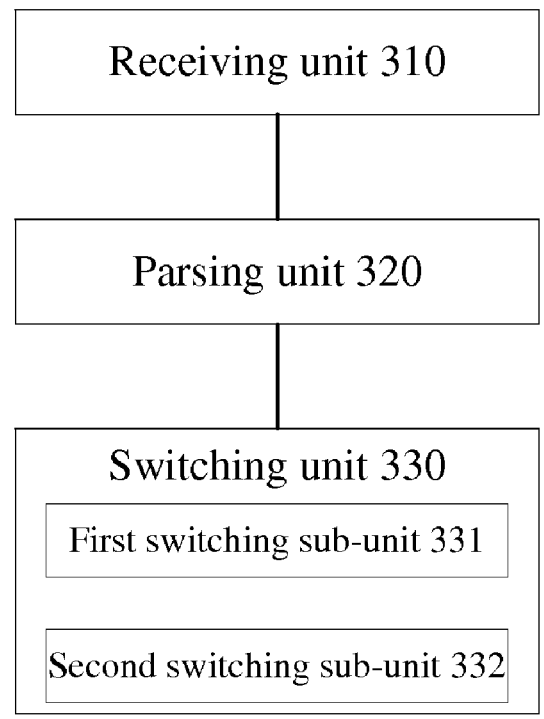
FIG. 7 is a schematic diagram illustrating a structure of a call application server according to an embodiment of the present invention.

As illustrated in FIG. 7, the call application server includes: a receiving unit 310, adapted to receive a switching message sent from the user during the call between the soft terminal or the mobile terminal, where the mobile terminal and the soft terminal are of a same number, and the opposite end, wherein the switching message carries the switching instruction information; a parsing unit 320, adapted to parse a Command tab contained in the body of the switching message, and to determine whether the tab is a call forwarding request or a call switching-into request; and a switching unit 330, adapted to perform a switching between the mobile terminal and the soft terminal, where the mobile terminal and the soft terminal are of a same number, according to the switching instruction information.

The switching unit includes: a first switching sub-unit 331, adapted to search for a physical number of the mobile terminal and initiate a call, to terminate the switching request and maintain the call on the soft terminal if the mobile terminal is unavailable, where the mobile terminal and the soft terminal are of a same number, and to establish a call session between the mobile terminal and the opposite user and release the call between the soft terminal and the opposite user if the mobile terminal operates normally. The switching unit further includes: a second switching sub-unit 332, adapted to obtain call information of the mobile terminal of the user which is of the same number as the soft terminal, to initiate a call request to the soft terminal, and to establish the call between the soft terminal of the user and the opposite user and release the call between the mobile terminal and the opposite user after receiving an answer of the user from the soft terminal.

Figure 8:
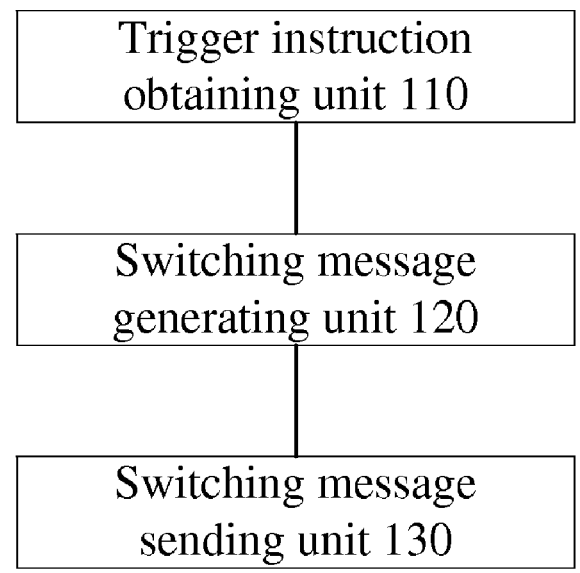
FIG. 8 is a schematic diagram illustrating a structure of a soft terminal according to an embodiment of the present invention.

As illustrated in FIG. 8, where the mobile terminal and the soft terminal are of a same number, the soft terminal 100 includes: a trigger instruction obtaining unit 110, adapted to obtain a switching instruction; a switching message generating unit 120, adapted to generate a switching message according to the switching instruction; and a switching message sending unit 130, adapted to send the switching message to the call application server.

According to the embodiments of the present invention, by triggering a switching function of the soft terminal, the user can switch an ongoing call on the soft terminal to the mobile terminal, or switch an ongoing call on the mobile terminal to the soft terminal, where the mobile terminal and the soft terminal are of a same number. The opposite party of the call feels no difference during the whole call switching process, thus achieving a seamless switching.

Based on the above-described embodiments, those skilled in the art can understand that the present invention can be implemented by incorporating software with a necessary common-purpose hardware platform, and certainly, it can be alternatively implemented by hardware. For many circumstances, the former is a more preferred embodiment. According to such understanding, the technical solution of the present invention can essentially, or in part which contributes to conventional systems, be embodied by way of software product. The software product can be stored in a storage medium, which includes certain instructions for making a computer device (e.g., a personal computer, a server, a network device, etc.) to execute the method according to any of the embodiments of the present invention.

The above disclosure merely represents several specific embodiments, instead of being intended to limit the present invention. Variations devised by those skilled in the art are considered as falling into the scope of the present invention.

What is claimed is:

1. A method for call switching based on a mobile terminal of a number and a soft terminal of the same number, comprising:
    receiving switching instruction information sent from the soft terminal during a call between the soft terminal and an opposite user or between the mobile terminal and the opposite user, wherein the switching instruction information is carried in an extended operation identifier of a Command contained in a body of a switching message; and
    determining a type of the switching instruction information according to the extended operation identifier of the Command, and performing a switching between the mobile terminal and the soft terminal according to the type of the switching instruction information.

2. The method according to claim 1, wherein the type of the switching instruction information comprises:
    a call forwarding request or a call switching-into request.

3. The method according to claim 2, wherein when the type of the switching instruction information is the call forwarding request, the performing the switching comprises:
    initiating, according to the call forwarding request, a call of the number of the mobile terminal in a call application server and establishing the call between the mobile terminal and the opposite user.

4. The method according to claim 2, wherein when the type of the switching instruction information is the call switching-into request, the performing the switching comprises:
    initiating a call request to the soft terminal according to the switching instruction information, and establishing the call between the soft terminal and the opposite user after receiving an answer from the soft terminal.

5. A system for call switching based on a mobile terminal of a number and a soft terminal of the same number, comprising the soft terminal, the mobile terminal and a call application server, wherein
    the call application server is adapted to receive switching instruction information sent from the soft terminal during a call between the soft terminal and an opposite user or between the mobile terminal and the opposite end, and to perform a switching between the mobile terminal and the soft terminal according to the switching instruction information, wherein the switching instruction information is carried in an extended operation identifier of a Command contained in a body of a switching message.

6. The system for call switching based on a mobile terminal of a number and a soft terminal of the same number according to claim 5, wherein the call application server comprises:
    a receiving unit, adapted to receive a switching message sent from the soft terminal during the call between the soft terminal and the opposite end, or during the call between the mobile terminal and the opposite end;
    a parsing unit, adapted to parse an operation identifier of command contained in a body of the switching message, and to determine whether the operation identifier represents a call forwarding request or a call switching-into request; and
    a switching unit, adapted to perform the switching between the mobile terminal and the soft terminal according to a parse result of the parsing unit.

7. The system for call switching based on a mobile terminal of a number and a soft terminal of the same number according to claim 5, wherein the soft terminal comprises:
    a trigger instruction obtaining unit, adapted to obtain a switching instruction from the user;
    a switching message generating unit, adapted to generate a switching message according to the switching instruction; and
    a switching message sending unit, adapted to send the switching message to the call application server.

8. A call application server, comprising:
    a receiving unit, adapted to receive a switching message sent from a soft terminal of a number during a call between the soft terminal and an opposite end or between a mobile terminal of the same number and the opposite end, wherein switching instruction information is carried in an extended operation identifier of a Command contained in a body of the switching message;
    a parsing unit, adapted to parse an operation identifier of command contained in a body of the switching message, and to determine whether the operation identifier represents a call forwarding request or a call switching-into request; and
    a switching unit, adapted to perform a switching between the mobile terminal and the soft terminal according to a parse result of the parsing unit.

9. The call application server according to claim 8, wherein the switching unit comprises:
    a first switching sub-unit, adapted to search for a number of the mobile terminal and initiate a call, and to establish the call between the mobile terminal and the opposite user if the mobile terminal operates normally.

10. The call application server according to claim 8, wherein the switching unit further comprises:

a second switching sub-unit, adapted to initiate a call request to the soft terminal, and to establish the call between the soft terminal and the opposite end after receiving an answer from the soft terminal.

11. The call application server according to claim 9, wherein the switching unit further comprises:

a second switching sub-unit, adapted to initiate a call request to the soft terminal, and to establish the call between the soft terminal and the opposite end after receiving an answer from the soft terminal.

* * * * *